United States Patent
Itoh et al.

(10) Patent No.: US 10,886,755 B2
(45) Date of Patent: Jan. 5, 2021

(54) POWER CONTROL SYSTEM, METHOD, AND POWER CONTROL APPARATUS

(71) Applicant: SHARP KABUSHIKI KAISHA, Sakai (JP)

(72) Inventors: Akinori Itoh, Sakai (JP); Masatsune Terauchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 63 days.

(21) Appl. No.: 15/322,625

(22) PCT Filed: May 12, 2015

(86) PCT No.: PCT/JP2015/063569
§ 371 (c)(1),
(2) Date: Dec. 28, 2016

(87) PCT Pub. No.: WO2016/002347
PCT Pub. Date: Jan. 7, 2016

(65) Prior Publication Data
US 2017/0133866 A1    May 11, 2017

(30) Foreign Application Priority Data
Jul. 3, 2014 (JP) .................................. 2014-137677

(51) Int. Cl.
*H02J 7/00* (2006.01)
*H02J 3/32* (2006.01)
(Continued)

(52) U.S. Cl.
CPC .............. *H02J 7/0021* (2013.01); *H02J 3/14* (2013.01); *H02J 3/32* (2013.01); *H02J 7/0016* (2013.01);
(Continued)

(58) Field of Classification Search
CPC .......... H02J 7/0016; H02J 7/0021; H02J 7/34; H02J 7/345; H02J 2007/0001;
(Continued)

(56) References Cited

U.S. PATENT DOCUMENTS

| 2012/0074909 A1* | 3/2012 | Hondo | ...................... H02J 3/32 320/128 |
| 2015/0326017 A1* | 11/2015 | Sasaki | ...................... H02J 3/14 307/24 |

FOREIGN PATENT DOCUMENTS

| JP | 2004-048982 A | 2/2004 |
| JP | 2013-198207 A | 9/2013 |

(Continued)

OTHER PUBLICATIONS

International Search Report dated Jul. 28, 2015 in PCT Application No. PCT/JP2015/063569.

*Primary Examiner* — Nathaniel R Pelton
*Assistant Examiner* — Michael N Dibenedetto
(74) *Attorney, Agent, or Firm* — ScienBiziP, P.C.

(57) ABSTRACT

In a power control system, a server transmits to each facility data generated by estimating a variation with time in power consumption in each facility and an upper limit value of power capable of being supplied to each facility. A HEMS controller calculates the sum of amounts of electric power consumed over an upper limit value on the basis of estimation data. A power conditioner reserves the power corresponding to the result of calculation in a storage battery in advance. The power conditioner supplies the power corresponding to the power storage capacity reserved in the storage battery to the facility in a case where the power consumption in the facility exceeds the upper limit value such that the upper limit of the power to be supplied from the system to the facility is set to the upper limit value.

4 Claims, 10 Drawing Sheets

(51) Int. Cl.
*H02J 7/35* (2006.01)
*H02J 13/00* (2006.01)
*H02J 3/14* (2006.01)
*H02J 3/00* (2006.01)

(52) U.S. Cl.
CPC ............ *H02J 7/35* (2013.01); *H02J 13/0062* (2013.01); *H02J 13/0075* (2013.01); *H02J 13/0079* (2013.01); *H02J 3/003* (2020.01); *H02J 7/00034* (2020.01); *H02J 2310/14* (2020.01); *Y02B 70/30* (2013.01); *Y02B 70/3225* (2013.01); *Y02B 90/20* (2013.01); *Y02E 40/70* (2013.01); *Y04S 10/123* (2013.01); *Y04S 20/12* (2013.01); *Y04S 20/222* (2013.01); *Y04S 20/242* (2013.01); *Y04S 40/124* (2013.01); *Y04S 40/126* (2013.01)

(58) Field of Classification Search
CPC ........ H02J 2007/0096; H02J 3/14; H02J 3/32; Y02B 70/30; Y02B 70/3225; Y02B 90/20; Y04S 20/12; Y04S 20/222; Y04S 20/242; Y04S 40/124; Y04S 40/126
USPC ........ 320/101, 102, 123, 124, 138, 148, 155
See application file for complete search history.

(56) References Cited

FOREIGN PATENT DOCUMENTS

| JP | 2013198207 A | * | 9/2013 | |
| JP | 2014017975 A | * | 1/2014 | ................ H02J 3/14 |

\* cited by examiner

FIG. 4

| FACILITY IDENTIFICATION INFORMATION | POWER CONSUMPTION ESTIMATION DATA | | |
|---|---|---|---|
| | ESTIMATION TIME | TARGET DEVICE | ESTIMATED POWER CONSUMPTION |
| 12345678 | MAY/05/2015 17:00:00 | ENTIRE FACILITY | 750 W |
| | | HOME ELECTRICAL APPLIANCE 1 | 100 W |
| | | HOME ELECTRICAL APPLIANCE 2 | 200 W |
| | | HOME ELECTRICAL APPLIANCE 3 | 450 W |
| | MAY/05/2015 17:15:00 | ENTIRE FACILITY | 2600 W |
| | | HOME ELECTRICAL APPLIANCE 1 | 1900 W |
| | | HOME ELECTRICAL APPLIANCE 2 | 250 W |
| | | HOME ELECTRICAL APPLIANCE 3 | 450 W |

162A — FACILITY IDENTIFICATION INFORMATION
162B — ESTIMATION TIME
162C — TARGET DEVICE
162D — ESTIMATED POWER CONSUMPTION
162

FIG. 5

| SETTING DATE | UPPER LIMIT VALUE MANAGEMENT DATA | | |
|---|---|---|---|
| | FACILITY IDENTIFICATION INFORMATION | PEAK POWER UPPER LIMIT VALUE | ADDITIONALLY SET VALUE |
| MAY/05/2015 | 12345678 | 3000 W | |
| | 55ee66ff | 1000 kW | 100 kW |
| | 9876fdsa | 100 kW | |
| | 5432ghjk | 500 kW | |

POWER CONTROL SYSTEM, METHOD, AND POWER CONTROL APPARATUS

This application is the U.S. national phase of International Application No. PCT/JP2015/063569 filed May 12, 2015, which designated the U.S. and claims priority to Japanese Application 2014-137677 filed Jul. 3, 2014, the entire contents of each of which are hereby incorporated by reference.

TECHNICAL FIELD

The present disclosure relates to power control. More particularly, the present disclosure relates to a power control system that controls power supplied to a facility, such as a house, to control supply-demand balance between power supplied form an electric power supplier, such as an electric power company, and power consumption consumed by each facility, a method, and a power control apparatus provided in each facility.

BACKGROUND ART

Systems including home energy management systems (HEMSs) have been in widespread use in recent years in order to control energy consumption by consumers who receive supply of power. For example, storage batteries and solar cells are provided in facilities of consumers, and power conditioners control supply of power from systems to the facilities, charge of the storage batteries and discharge from the storage batteries, and supply or selling of power generated by the solar cells to the facilities. With such systems, for the consumers, the amounts of consumption of the power supplied from the systems are suppressed to reduce electric power rates. For the electric power suppliers (electric power companies) having power plants and substations, the loads are smoothed to stabilize the supply of power.

For example, Japanese Unexamined Patent Application Publication No. 2004-48982 describes a technology to perform charge of a secondary battery during a time period in which an amount-of-electric-power charge is relatively inexpensive and discharge from the secondary battery outside the above time period, as a technology to reduce the electric power rate. With this technology, an excess charge in electric power contract is suppressed, change of contracted power is avoided, and reduction of the electric power rate is achieved.

CITATION LIST

Patent Literature

PTL 1: Japanese Unexamined Patent Application Publication No. 2004-48982

SUMMARY OF INVENTION

Technical Problem

The electric power rate is composed of, for example, a basic rate based on the contracted power and the amount-of-electric-power charge based on the power usage. Although the electric power rate is reduced by charging the storage battery during the time period in which the amount-of-electric-power charge is relatively inexpensive with the technology described in PTL 1, it is desirable for the consumers of the electric power to further reduce the electric power rate. In addition, also for the electric power suppliers (electric power companies), it is desirable that the power be used in each facility while the peak of electric power demand is being suppressed so as not to exceed the maximum electric power which the electric power suppliers are capable of supplying by smoothing the peak of the electric power demand. Accordingly, it is required to provide a power control system capable of responding to requests from both the consumers and the electric power suppliers by controlling the supply of power to multiple facilities.

Solution to Problem

A power control system according to an embodiment controls supply of power to multiple facilities. The power control system includes a storage battery that is provided in at least one of the facilities, that is charged with power that is supplied, and that discharges stored power to supply power to the facility in which the storage battery is provided; estimation data storage means for storing estimation data generated by estimating a variation with time in power consumption in the at least one facility in which the storage battery is provided; setting value storage means for storing upper limit value management information indicating an upper limit value of power to be supplied from a system to the at least one facility in which the storage battery is provided; charge control means for calculating a sum of power consumed over the upper limit value during a time period in which the power consumption is estimated to exceed the upper limit value of the power to be supplied from the system to the facility on the basis of the estimation data for the at least one facility in which the storage battery is provided and charging the storage battery in the facility with the power corresponding to an amount of electric power that is calculated before the time period in which the power consumption is estimated to exceed the upper limit value; and supply control means for supplying the power stored in the storage battery in the facility to the facility in a case where the power consumption in the facility exceeds the upper limit value such that an upper limit of the power to be supplied from the system to the facility is set to the upper limit value for the at least one facility in which the storage battery is provided.

According to another embodiment, a method for controlling supply of power to multiple facilities is provided. At least one facility is provided with a storage battery that is charged with power that is supplied and that discharges stored power to supply power to the facility in which the storage battery is provided. Storage means stores estimation data generated by estimating a variation with time in power consumption in the at least one facility in which the storage battery is provided and upper limit value management information indicating an upper limit value of power to be supplied from a system to the at least one facility in which the storage battery is provided. The method includes calculating, by charge control means, a sum of power consumed over the upper limit value during a time period in which the power consumption is estimated to exceed the upper limit value of the power to be supplied from the system to the facility on the basis of the estimation data for the at least one facility in which the storage battery is provided and charging the storage battery in the facility with the power corresponding to an amount of electric power that is calculated before the time period in which the power consumption is estimated to exceed the upper limit value; and supplying, by supply control means, the power stored in the storage battery in the facility to the facility in a case were the power consumption in the facility exceeds the upper limit value such that an upper limit of the power to be supplied from the system to the facility is set to the upper limit value for the at least one facility in which the storage battery is provided.

According to another embodiment, a power control apparatus for controlling supply of power to a facility through communication with an external communication device is provided. A storage battery that is charged with power that is supplied and that discharges stored power to supply power to the facility is provided in the facility. The power control apparatus includes communication means for communicating with the external communication device; charge control means for controlling the charge of the storage battery; estimation data storage means for storing estimation data generated by estimating a variation with time in power consumption in the facility; setting value storage means for storing an upper limit value of power to be supplied from a system to the facility; and supply control means for controlling supply of power from the storage battery to the facility. The communication means receives information about the upper limit value from the external communication device and stores the received upper limit value in the setting value storage means. The charge control means calculates a sum of power consumed over the upper limit value during a time period in which the power consumption is estimated to exceed the upper limit value of the power to be supplied from the system to the facility on the basis of the estimation data and charges the storage battery with the power corresponding to an amount of electric power that is calculated before the time period in which the power consumption is estimated to exceed the upper limit value. The supply control means supplies the power stored in the storage battery to the facility in a case where the power consumption in the facility exceeds the upper limit value such that an upper limit of the power to be supplied from the system to the facility is set to the upper limit value.

Advantageous Effects of Invention

The basic rate of the electric power rate may be determined by the magnitude of peak power to be supplied to a consumer. According to an embodiment, further decreasing the peak power to be supplied to a facility of the consumer allows the electric power rate to be further reduced.

The above and other objects, characteristics, aspects, and advantages of the present invention will be apparent from the following detailed description of the present invention, which will be understood with reference to the attached drawings.

BRIEF DESCRIPTION OF DRAWINGS

FIG. 4 illustrates the data structure of power consumption estimation data 162 stored in the server 100.

FIG. 5 illustrates the data structure of upper limit value management data 163 stored in the server 100.

DESCRIPTION OF EMBODIMENTS

Figure 1:
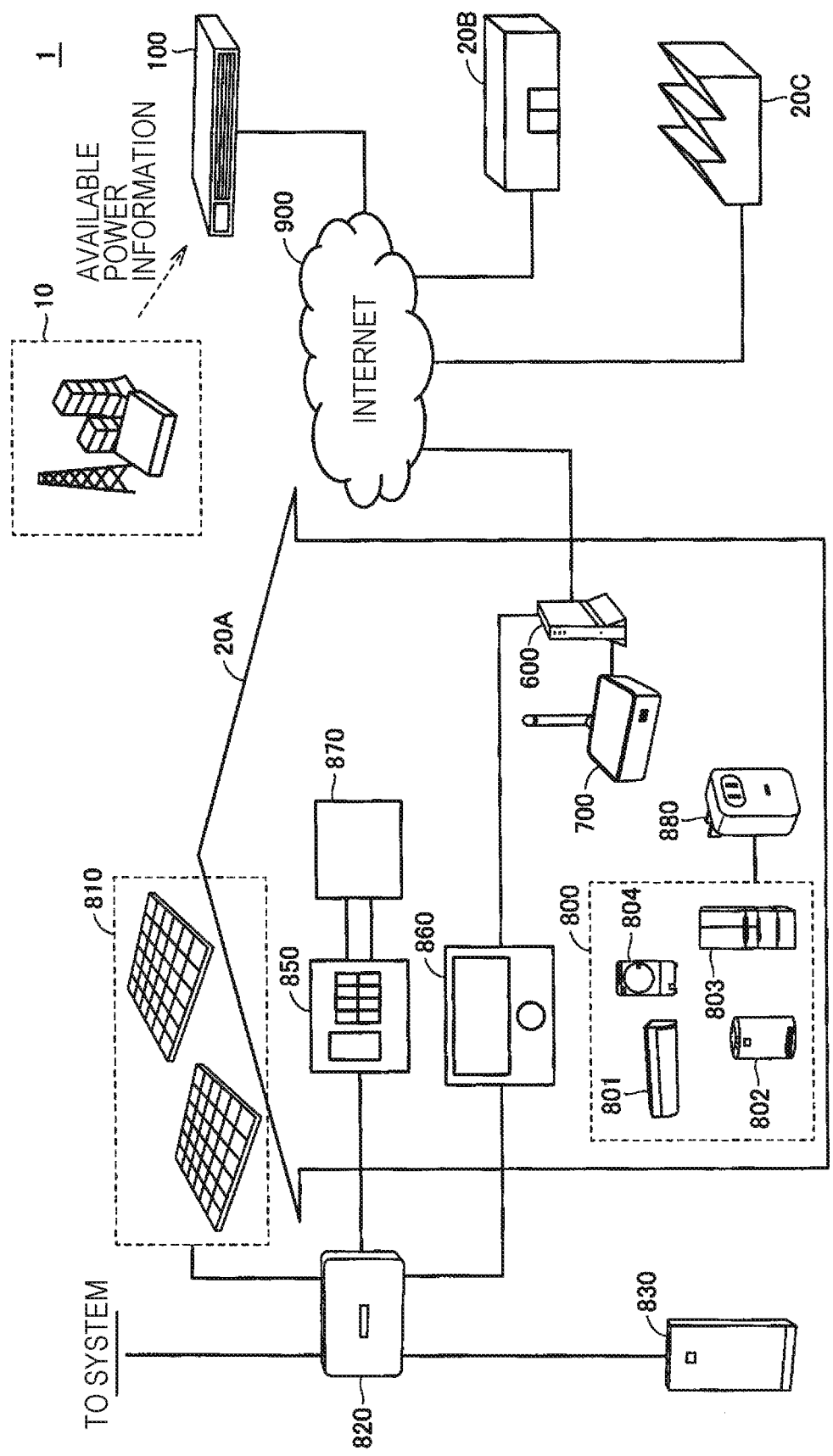
FIG. 1 is a block diagram schematically illustrating the configuration of a power control system 1 according to a first embodiment.

Embodiments of the present invention will herein be described with reference to the attached drawings. The same reference numerals are used in the following description to identify the same components. The same applies to their names and functions. Accordingly, a detailed description of such components, names, and functions is not repeated.

First Embodiment

FIG. 1 is a block diagram schematically illustrating the configuration of a power control system 1 according to a first embodiment in the power control system 1, a server 100 controls supply of power to multiple facilities (facilities 20A, 20B, and 20C). The server 100 receives information about power available from a power plant 10 (available power information) to control supply of system power to each facility so that the system power to be supplied to each facility does not exceed the maximum power available from the power plant 10. The facility 20A is a general household building, the facility 20B is a commercial facility, such as a shopping mall, and the facility 20C is a factory. The amount of power demand is varied for each facility. A broadband router 600 and a HEMS controller 700 provided in the facility 20A and a power conditioner 820 and a storage battery 830 provided outside the facility 20A are also provided in the facility 20B and the facility 20C. In other words, the devices, such as the power conditioner 820 and the storage battery 830, are provided in each facility managed by the server 100.

Referring to FIG. 1, the power control system 1 includes the server 100, the broadband router 600, and the HEMS controller 700. The apparatuses including the broadband router 600 and the server 100 are connected to the Internet 900.

Apparatuses provided in each facility will now be described, taking the facility 20A, which is a building, as an example. The broadband router 600 and the HEMS controller 700 are arranged in the building (facility 20A). A solar cell module 810 including multiple solar cell modules is arranged in a roof portion outside the building. The power conditioner 820 and the storage battery 830 are also provided outside the building. A power distribution board 850, a multi-energy monitor 860, a multi-circuit current transformer (CT) sensor 870, multiple home electrical appliances 800 including an air conditioner 801, an air cleaner 802, a refrigerator 803, and a washing machine 804, and a tap 880 are arranged inside the building.

The server 100 is a computer system including a mass storage unit. The server 100 acquires weather data and other information including an actual power consumption value of each building from another communication device to calculate, for example, an estimated power consumption value of each facility and an estimated value of power generated in the solar cell module provided on each facility. In addition, the server 100 receives information about the electric power available from the power plant 10 to set for each facility an upper limit value of the electric power to be supplied from a system to each facility so that the upper limit value does not exceed the power available from the power plant 10.

The CT sensor 870 measures power consumption of a device to be provided and transmits data about the measured power consumption to the HEMS controller 700. In the first embodiment, the CT sensor 870 is capable of being connected to a main breaker and a branch breaker of the power distribution board 850. When the CT sensor 870 is connected to the main breaker of the power distribution board 850, the CT sensor 870 measures the power consumption in the entire building. When the branch breaker supports the entire room, connection of the CT sensor 870 to the branch breaker of the power distribution board 850 enables the CT sensor 870 to measure the power consumption in the entire room.

The tap 880 is a power consumption measurer that measures the power consumption of the home electrical appliances 800. The tap 880 transmits the result of measurement of the power consumption to the HEMS controller 700 through wireless communication. The tap 880 is provided with a plug (not illustrated) and is connected to an outlet in the building. Each of the home electrical appliances (for example, the air conditioner 801, the air cleaner 802, the refrigerator 803, and the washing machine 804) connected to the tap 880 receives supply of power from the power distribution board 850 when the tap 880 is connected to the outlet.

The broadband router 600 is connected to the Internet 900 and establishes wireless communication with other communication devices using its wireless local area network (LAN) function conforming to a standard, such as Institute of Electrical and Electronic Engineers (IEEE) 802. 11. The broadband router 600 is connected to other communication devices in wired manners according to a LAN standard and is connected to the HEMS controller 700 and the multi-energy monitor 860 in wired manners. The power conditioner 820, the multi-energy monitor 860, the broadband router 600, and the HEMS controller 700 are connected to each other in a wired manner for communication.

The HEMS controller 700 is connected to the broadband router 600 over a wired LAN. The HEMS controller 700 has a wireless communication function. The HEMS controller 700 wirelessly communicates with devices including the CT sensor 870 and the tap 880 to receive the result of measurement of the power consumption in each device, the result of measurement of the power consumption in the entire building, and so on from the devices for storage. The HEMS controller 700 transmits the result of measurement of the power consumption in each device and the result of measurement of the power consumption in the entire building to the server 100 via the broadband router 600. In addition, the HEMS controller 700 transmits the results of measurement of the power consumption to the multi-energy monitor 860 via the broadband router 600 in order to visualize the power consumption in each device and the power consumption in the entire building.

The multi-energy monitor 860 is a monitor apparatus that displays the operation statuses of multiple energy systems including a solar power system and a storage battery system to allow a user to easily control the working statuses of various devices. The multi-energy monitor 860 is connected to the power conditioner 820.

The storage battery 830 and the solar cell module 810 are connected to the power conditioner 820. The power conditioner 820 supplies power from the system to the power distribution board 850 in the building. The power conditioner 820, which has a function to convert direct-current power generated in the solar cell module 810 into alternate-current power usable in the building, supplies the power generated in the solar cell module 810 to the power distribution board 850 in the building or the storage battery 830 and externally sells the power generated in the solar cell module 810 with an electric power meter. In addition, the power conditioner 820 controls charge of the storage battery 830 and discharge from the storage battery 830.

As described above, the HEMS controller 700 receives the result of measurement of the power consumption from each device in the building and transmits the received result of measurement to the server 100 via the broadband router 600. The server 100 receives the result of measurement of the power consumption in the building from the HEMS controller 700 over the Internet 900 and calculates and outputs the estimated power consumption value of the building on the basis of the history of the past power consumption. The server 100 transmits the estimated power consumption value of the building to the HEMS controller 700 over the Internet 900. In addition, the server 100 sequentially updates the upper limit value of the power to be supplied from system to each facility on the basis of information about the power available from the power plant 10 and transmits the updated upper limit value to each facility.

The HEMS controller 700 receives estimation data resulting from estimation of variation with time in the power consumption in the building and the upper limit value set for the building by the server 100 from the server 100 over the Internet 900 and stores the estimation data and the upper limit value that are received. The HEMS controller 700 sets the upper limit of the power to be supplied from the system to the building via the power conditioner 820 within a range that does not exceed the upper limit value received from the server 100. The HEMS controller 700 identifies a time period in which the power consumption is estimated to exceed the upper limit value of the power to be supplied to the building, for example, in the estimation data about the power consumption during one day. The HEMS controller 700 calculates the difference between the power consumption indicated in the estimation data and the upper limit value during the identified time period to calculate the sum of the power estimated to be consumed over the upper limit value.

The HEMS controller 700 is capable of controlling the operation of the power conditioner 820 via the broadband router 600 and the multi-energy monitor 860. The HEMS controller 700 charges the storage battery 830 with the power corresponding to the result of calculation (amount of electric power) of the sum of the power estimated to be consumed over the upper limit value with the power conditioner 820 before the time period in which the power consumption is estimated to exceed the upper limit value in the estimation data about the power consumption. The power conditioner 820 reserves power storage capacity corresponding to the upper limit value in the storage battery 830 in response to a control signal from the HEMS controller 700 and supplies the power from the system or the power generated in the solar cell module 810 to the storage battery 830 up to the reserved power storage capacity. For example, the power conditioner 820 charges the storage battery 830 with the power corresponding to one day, which corresponds to the amount of electric power estimated to be consumed over the upper limit value in the estimation data about the power consumption, during a predetermined time (for example, during a midnight time period in which the electric power rate is relatively inexpensive).

The power conditioner 820 compares the power consumption in the building with the upper limit value and, in a case where the power supplied from the system to the building reaches the upper limit value, supplies the power stored in the storage battery 830 to the power distribution board 850 in the building. This enables the power conditioner 820 to supply the power stored in the storage battery 830 to the power distribution board 850 in the building so that the power to be supplied from the system to the building does not exceed the upper limit value (the upper limit of the power to be supplied from the system to the building is set to the upper limit value). The power conditioner 820 may perform discharge of the power that is stored in advance in the storage battery 830 and may supply the discharged power to the power distribution board 850 during the time period in which the power consumption is estimated to exceed the upper limit value in the estimation data about the power consumption under the control of the HEMS controller 700.

<Configuration of Server 100>

Figure 2:
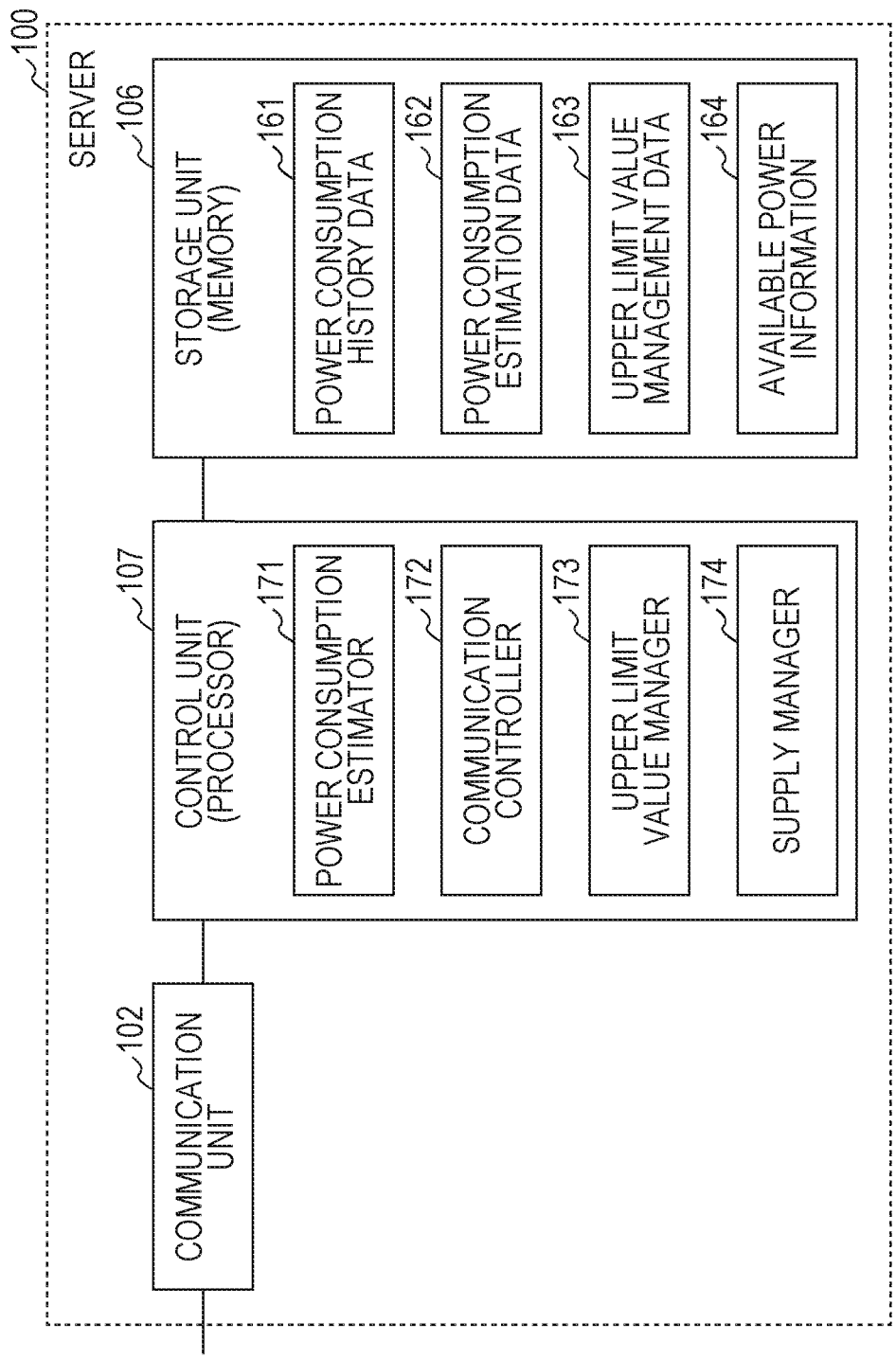
FIG. 2 is a block diagram illustrating the configuration of a server 100.

FIG. 2 is a block diagram illustrating the configuration of the server 100. Referring to FIG. 2, the server 100 includes a communication unit 102, a storage unit 106, and a control unit 107.

The communication unit 102 is a communication interface that performs, for example, modulation and demodulation for transmitting and receiving a signal to and from another communication device by the server 100.

The storage unit 106 is composed of, for example, a flash memory, a hard disk drive (HDD), or a random access memory (RAM). The storage unit 106 stores programs used by the server 100 and accumulates a variety of data used by the server 100. In an aspect, the storage unit 106 stores power consumption history data 161, power consumption estimation data 162, upper limit value management data 163, and available power information 164. The power consumption history data 161 is data indicating the history of the power consumption in each facility managed by the server 100. The power consumption history data 161 indicates the history of, for example, the power consumption in the entire facility of each facility and the power consumption of the home electrical appliances provided in each facility. The power consumption estimation data 162 is data generated by estimating the variation with time in the power consumption in each facility, which is calculated through an arithmetic operation on the basis of the past actual power consumption value indicated in the power consumption history data 161 by the server 100. The upper limit value management data 163 is data defining the upper limit value of the power to be supplied from the system for each facility. The available power information 164 is data indicating the maximum value of the system power available from the power plant 10.

The control unit 107 reads out and executes a control program stored in the storage unit 106 to control the operation of the server 100. The control unit 107 is realized by, for example, multiple processors. The control unit 107 operates according to the program to function as a power consumption estimator 171, a communication controller 172, an upper limit value manager 173, and a supply manager 174.

The power consumption estimator 171 calculates the power consumption estimation data 162 generated by estimating the variation with time in the power consumption in each facility on the basis of the power consumption in the entire facility of each facility and the actual power consumption value of each device provided in each facility, which are received from the HEMS controller 700. The power consumption may be estimated using (i) a method of calculating an average value of the history of the power consumption during a past predetermined period (for example, the actual power consumption value during past three weeks before the day when the estimation is performed or the actual power consumption value during past one week) to output the calculated average value as the estimated power consumption value, (ii) a method of calculating an average value of the history of the power consumption with reference to the history of the power consumption on the same day of week as that of the date when the estimation is performed to output the calculated average value as the estimated power consumption value because the trend of the power consumption may be varied with the day of week, or (iii) a method of calculating an average value of the power consumption with reference to the history of the power consumption on days having weather conditions similar to the weather (temperature, humidity, air flow, and so on) of the date when the estimation is performed, in the history of the power consumption during a past predetermined period, to output the calculated average value as the estimated power consumption value because the trend of the power consumption may also be varied with the weather. Alternatively, the estimated power consumption value may be output using a combination of the methods (i) to (iii).

The communication controller 172 controls a process to communicate with another communication device over the Internet 900 by the server 100. For example, the communication controller 172 receives the result of measurement of the power consumption in each facility from the HEMS controller 700 provided in the facility and stores the received result of measurement as the power consumption history data 161. In addition, the communication controller 172 transmits the power consumption estimation data 162 to the HEMS controller 700 in each facility.

The server 100 receives the available power information 164 from the power plant 10, for example, from a computer system in the power plant 10 over a network at a predetermined interval or at predetermined timing. The upper limit value manager 173 sets the upper values of the respective facilities so that the sum of the upper limit values of the respective facilities does not exceed the available power information 164 on the basis of data about the maximum value of the available system power indicated in the available power information 164 to update the upper limit value management data 163.

The supply manager 174 receives data indicating the total amount of the available power available from the power plant 10 as the system power from, for example, the computer system in the power plant 10 and stores the received data in the storage unit 106 as the available power information 164.

<Configuration of HEMS Controller 700>

Figure 3:
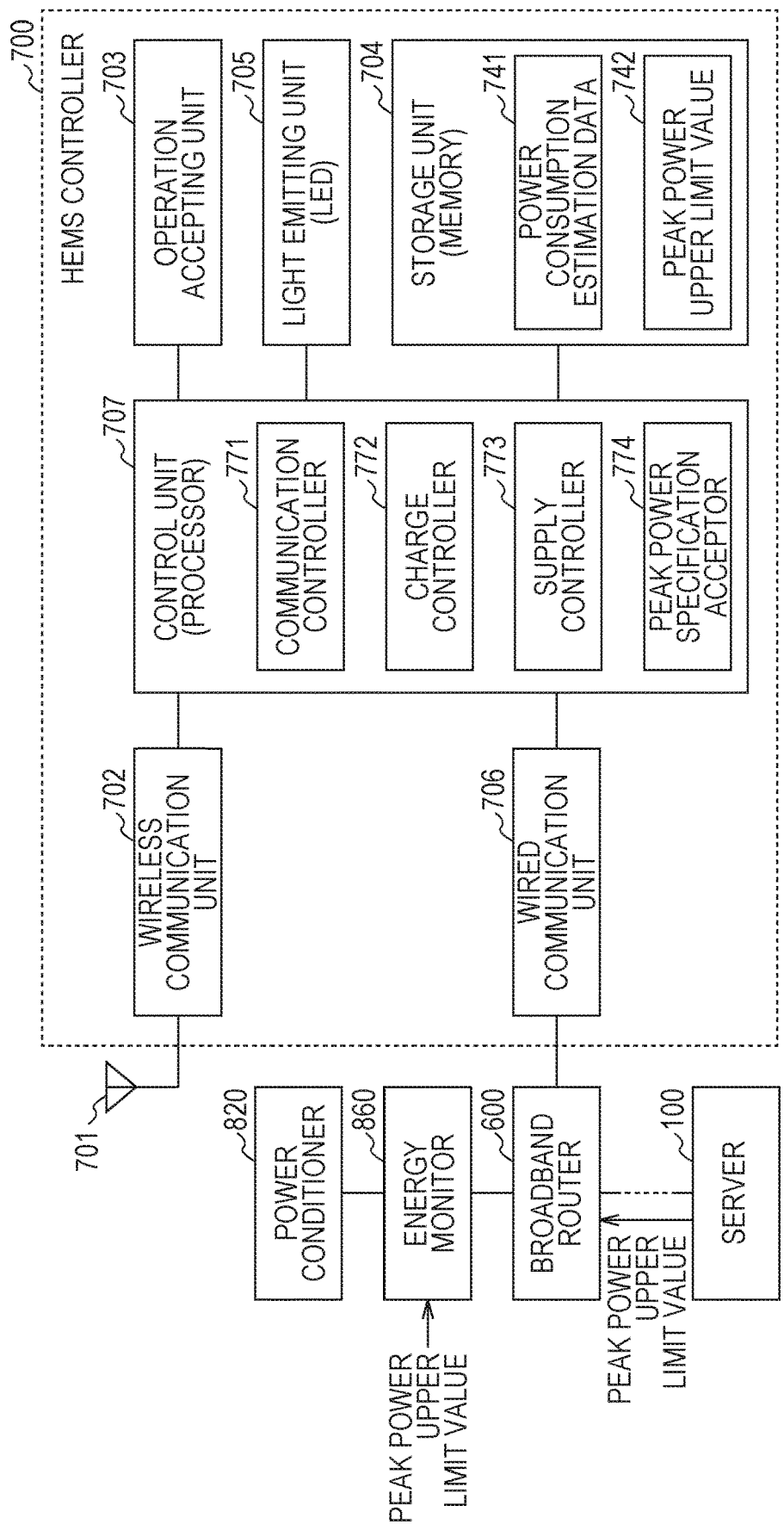
FIG. 3 is a block diagram illustrating the configuration of a HEMS controller 700.

FIG. 3 is a block diagram illustrating the configuration of the HEMS controller 700. The HEMS controller 700 receives the estimation data about the power consumption (the power consumption estimation data 162) in the entire building from the server 100, stores the received data as power consumption estimation data 741, determines the amount of electric power to be stored in the storage battery 830 with reference to the power consumption estimation data 741 and a peak power upper limit value 742, and causes the power conditioner 820 to perform charge of the storage battery 830 and discharge from the storage battery 830. In addition, the HEMS controller 700 receives information about the upper limit value set for the building from the server 100 and stores the received information as the peak power upper limit value 742. The upper limit value stored by the HEMS controller 700 as the peak power upper limit value 742 is sequentially updated by the server 100 and the HEMS controller 700 updates the peak power upper limit value 742 each time the HEMS controller 700 receives the upper limit value from the server 100.

Referring to FIG. 3, the HEMS controller 700 includes an antenna 701, a wireless communication unit 702, an operation accepting unit 703, a storage unit 704, a light emitting unit 705, a wired communication unit 706, and a control unit 707.

The antenna 701 radiates a signal to be transmitted from the HEMS controller 700 as radio waves. In addition, the antenna 701 receives radio waves from the space and supplies the reception signal to the wireless communication unit 702. The wireless communication unit 702 is a communication interface that performs, for example, modulation and demodulation of a signal for wireless communication with another communication device by the HEMS controller 700. The operation accepting unit 703 is composed of an operation member, such as buttons, which are used to accept an input operation. The operation accepting unit 703 accepts a user's input operation and supplies the accepted input operation to the control unit 707.

The storage unit 704 is composed of, for example, a flash memory or a RAM and stores programs used by the HEMS controller 700 and data. In an aspect, the storage unit 704 stores the power consumption estimation data 741 and the peak power upper limit value 742. The power consumption estimation data 741 is the estimation data generated by estimating the variation with time in the power consumption in the facility (building) in which the HEMS controller 700 is provided, which is received from the server 100 by the HEMS controller 700. The peak power upper limit value 742 indicates the upper limit value of the power to be supplied from the system through the power conditioner 820 to the facility (building) in which the HEMS controller 700 is provided. Although the peak power upper limit value 742 is updated on the basis of the data about the upper limit value received from the server 100, a specification by the user may be accepted as the peak power upper limit value 742 as long as the specified upper limit value is within the range of the upper limit value set by the server 100. For example, the user operates the multi-energy monitor 860, the multi-energy monitor 860 accepts a specification of the upper limit value by the user, and the HEMS controller 700 receives the accepted upper limit value from the multi-energy monitor 860. The HEMS controller 700 updates the peak power upper limit value 742 on the basis of the upper limit value specified by the user. The specification of the peak power upper limit value 742 by the user may be accepted with various devices including the HEMS controller 700.

The wired communication unit 706 is a communication interface that performs, for example, modulation and demodulation for wired communication with another communication device by the HEMS controller 700. The HEMS controller 700 is connected to the broadband router 600 with the wired communication unit 706 and communicates with the communication devices including the multi-energy monitor 860, the power conditioner 820, and the server 100 via the broadband router 600.

The control unit 707 reads out and executes a control program stored in the storage unit 704 to control the operation of the HEMS controller 700. The control unit 707 is realized by processors. The control unit 707 operates according to the program to function as a communication controller 771, a charge controller 772, a supply controller 773, and a peak power specification acceptor 774.

The communication controller 771 controls a communication process by the HEMS controller 700. For example, the communication controller 771 performs a process to communicate with the device in the building, such as the CT sensor 870 or the tap 880, to receive data about the power consumption from the device, a process to transmit the received data about the power consumption to the server 100, a process to receive the estimation data about the power consumption in the entire building from the server 100, and so on.

The charge controller 772 identifies a time period in which the estimated power consumption value is estimated to exceed the upper limit value indicated in the peak power upper limit value 742 on the basis of the power consumption estimation data 741 and calculates the sum of the power estimated to be consumed over the upper limit value during the identified time period. The charge controller 772 instructs the power conditioner 820 to charge the storage battery 830 so that the power of the amount of electric power calculated in the above manner is stored in the storage battery 830 in advance before the time period in which the power consumption is estimated to exceed the upper limit value.

The supply controller 773 transmits an instruction to the power conditioner 820 so that the upper limit of the power to be supplied from the system to the power distribution board 850 in the building is set to the upper limit value indicated in the peak power upper limit value 742. The power conditioner 820 receives the upper limit value from the HEMS controller 700, supplies the power from the system to the power distribution board 850 so that the power to be supplied from the system to the power distribution board 850 in the building does not exceed the upper limit value, and supplies the power stored in the storage battery 830 to the power distribution board 850 in the building in a case where the power consumption to be supplied from the system to the power distribution board 850 may possibly exceed the upper limit value. In other words, the power conditioner 820 supplies the power stored in the storage battery 830 and the power from the system to the power distribution board 850 in the building when the power consumption consumed in the building exceeds the upper limit value in order to prevent the power to be supplied from the system to the building from exceeding the upper limit value.

The peak power specification acceptor 774 performs a process to accept a specification of the upper limit of the power (the upper limit of peak power) to be supplied from the system to the facility. For example, the peak power specification acceptor 774 communicates with the multi-energy monitor 860, receives the upper limit value from the multi-energy monitor 860, which has accepted the specification of the upper limit of the peak power from the user, and stores the received upper limit value in the storage unit 704 as the peak power upper limit value 742 within a range in which the received upper limit value does not exceed the upper limit value specified by the server 100.

<Data Structure>

FIG. 4 illustrates the data structure of the power consumption estimation data 162 stored in the server 100.

Referring to FIG. 4, facility identification information 162A, estimation time 162B, target device 162C, and estimated power consumption 162D are associated with each other in each record in the power consumption estimation data 162. The facility identification information 162A is information to identify each facility managed by the server 100. The estimation time 162B indicates a time period when the power consumption in each facility is estimated. For example, the server 100 calculates and outputs the estimated power consumption value in each facility every predetermined period, for example, every 15 minutes.

The target device 162C indicates a target for which the power consumption is estimated in the facility indicated in the facility identification information 162A. For example, a target "entire facility" indicating the estimated value of the power consumption in the entire facility indicated in the facility identification information 162A or a target "home electrical appliance 1" indicating a device itself for which the power consumption is estimated in each facility is specified as the target device 162C. The estimated power consumption 162D indicates the value of the power consumption estimated for the entire facility or each device at the estimation time indicated in the estimation time 162B.

FIG. 5 illustrates the data structure of the upper limit value management data 163 stored in the server 100. The server 100 sets the upper limit of the power to be supplied from the system for each of the multiple facilities. In addition, the server 100 accepts a request to increase the available power from each facility.

Referring to FIG. 5, setting date 163A, facility identification information 163B, peak power upper limit value 163C, and additionally set value 163D are associated with each other in each record in the upper limit value management data 163.

The setting date 163A indicates the date and time when the server 100 sets the upper limit value for each of the multiple facilities. The facility identification information 163B is information to identify each facility. The peak power upper limit value 163C indicates the upper limit of the power to be supplied from the system to each facility, which is set by the server 100. The additionally set value 163D indicates additionally set power when the upper limit of the system power to be supplied to each facility is increased in response to a request from the facility to the server 100. Specifically, for example, when the power demand larger than that in normal time is estimated, each facility is capable of requesting the server 100 to increase the upper limit value to increase the magnitude of the power to be supplied from the system.

Figure 6:
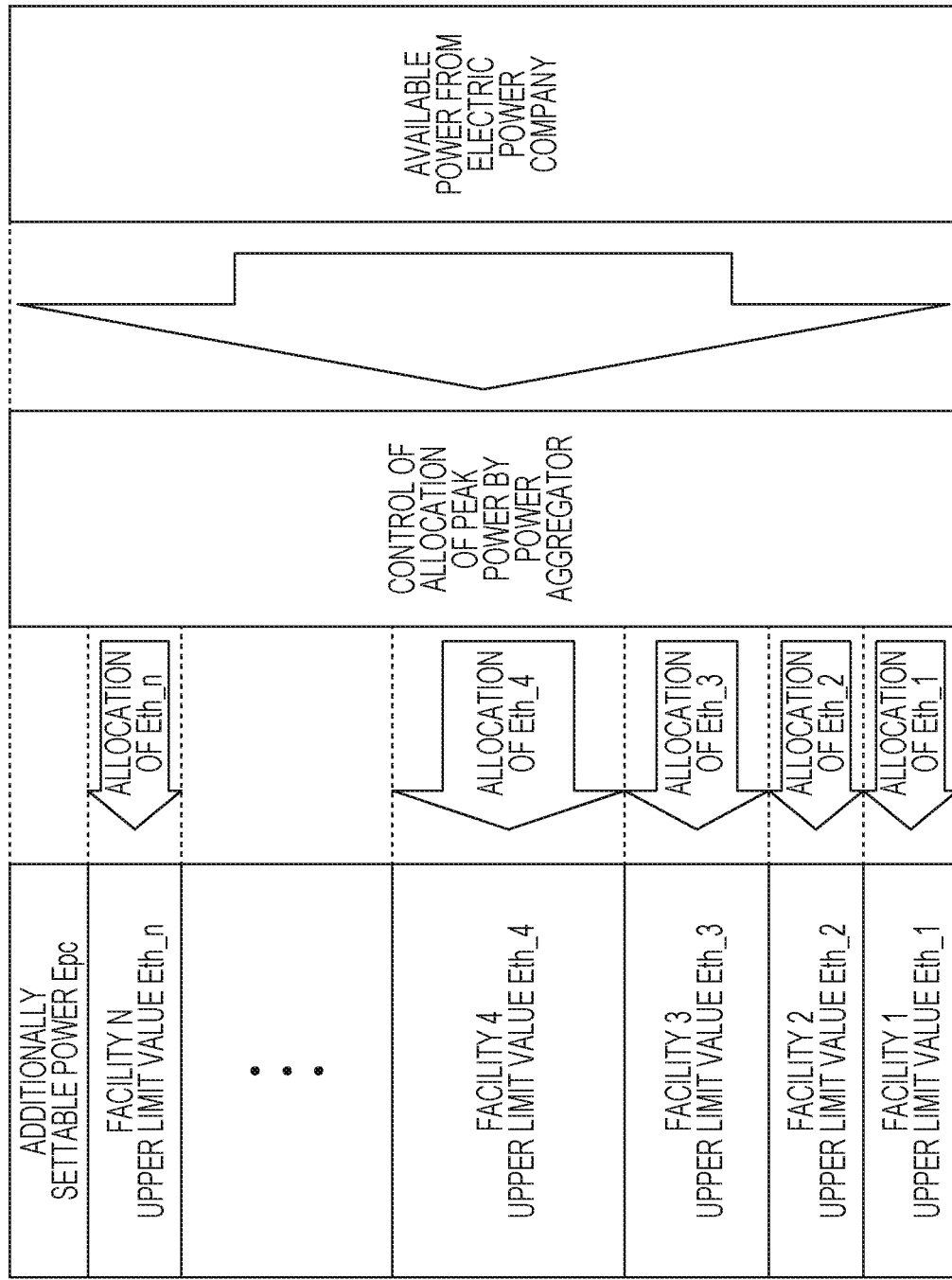
FIG. 6 schematically illustrates a process to set an upper limit value of each facility so as not to exceed power available from an electric power company, which is an electric power supplier, and is performed by the server 100 functioning as a power aggregator.

FIG. 6 schematically illustrates a process to set the upper limit value of each facility so as not to exceed the power available from an electric power company, which is an electric power supplier. The process is performed by the server 100 functioning as a power aggregator. The power aggregator smooths the peak of the power demand in each facility so as not to exceed the maximum power available from the electric power supplier to keep supply-demand balance of the power. For example, when a consumer wants to reduce the electric power rate, the power aggregator provides an inexpensive electric power rate while restricting the peak power in addition, the power aggregator performs control to, for example, temporarily Increase the power which is capable of being supplied to the facility in response to a request from the consumer.

As illustrated in FIG. 6, the server 100 functioning as a power aggregator allocates upper limit values $Eth\_1$, $Eth\_2$, $Eth\_3$, . . . , and $Eth\_n$ to the respective facilities and performs control so that the sum of the upper limit values allocated to the respective facilities does not exceed the power available from the electric power supplier (electric power company). In addition, the power aggregator allocates part of additionally settable power Epc to a facility which requests increase in the upper limit value in response to a request from each facility.

Figure 7:
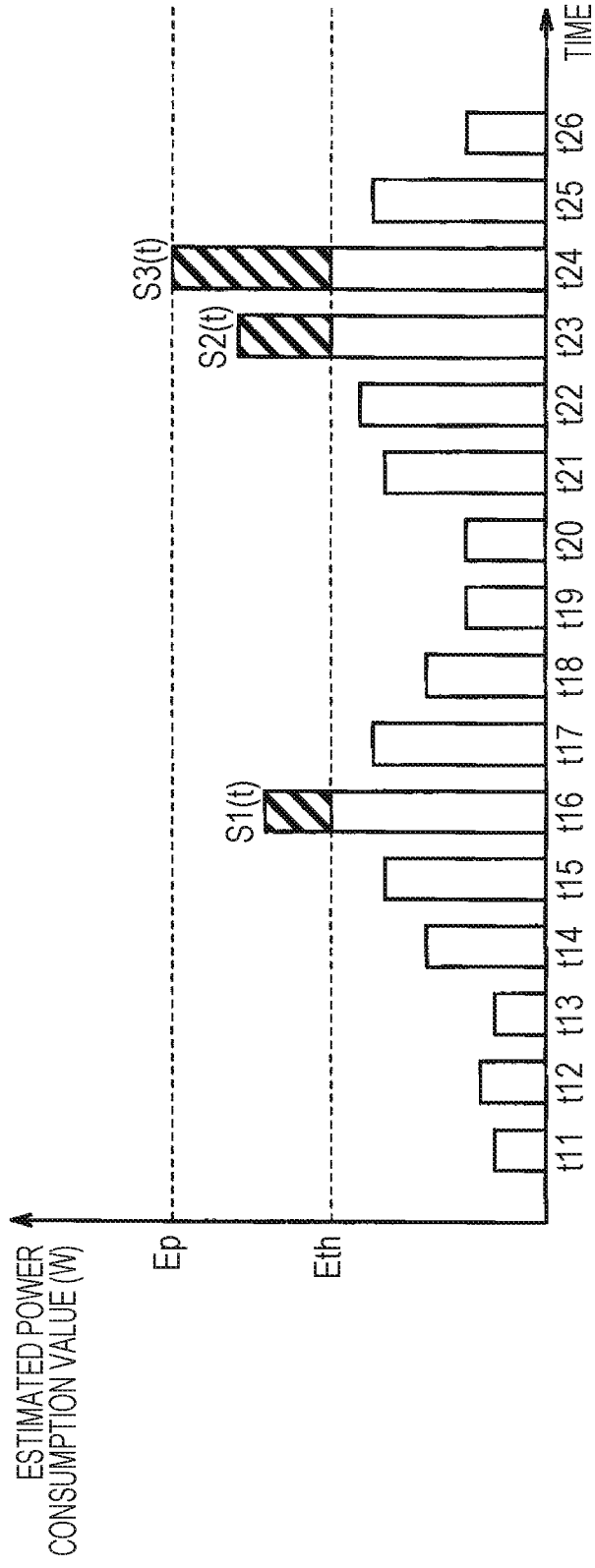
FIG. 7 illustrates a result of estimation of a variation with time of power consumption indicated by the power consumption estimation data 162.

FIG. 7 illustrates a result of estimation of the variation with time of the power consumption indicated by the power consumption estimation data 162. The HEMS controller 700 receives the power consumption estimation data 162 from the server 100 and stores the received power consumption estimation data as the power consumption estimation data 741. In FIG. 5 illustrating the result of estimation of the variation with time of the power consumption in a facility, the horizontal axis represents time and the vertical axis represents the power consumption estimated at each time. The example in FIG. 5 illustrates the result of estimation of the power consumption during one day and the power consumption estimation data 162 indicates the result of estimation of the power consumption for each period from a time t11 to a time t26. In the power consumption estimation data 162, the power consumption consumed in the facility is estimated to reach peak power Ep(W) at the time t24. When the upper limit value of the power to be supplied from the system to the facility (the peak power upper limit value 742) is an upper limit value Eth(W), the estimated power consumption value is estimated to reach the power consumption exceeding the upper limit value at the time t16, the time t23, and the time 24 in the power consumption estimation data 162.

It is assumed that the difference between the power consumption and the upper limit value (the power consumed over the upper limit value) at the time t16 is power $S1(t)$ (W), the difference between the power consumption and the upper limit value at the time t23 is power $S2(t)$ (W), and the difference between the power consumption and the upper limit value at the time t24 is power $S3(t)$ (W). In this case, during the period from the time t11 to the time t26, the sum of the amounts of electric power during a period in which the power consumption is higher than or equal to the upper limit value Eth(W) is the sum $Sp(t)=\Sigma Sn(t)=S1(t)+S2(t)+S3(t)$. The charge controller 772 in the HEMS controller 700 calculates the sum Sp(t) in the above manner.

The HEMS controller 700 charges the storage battery 830 with at least the power corresponding to the calculated sum Sp(t) before the time when the power consumption is estimated to exceed the upper limit value Eth. In the description of the present embodiment, the HEMS controller 700 reserves the power storage capacity resulting from addition of a margin $\Delta r(W)$ to the power corresponding to the sum Sp(t) in the storage battery 830. The power storage status in the storage battery 830 is managed by, for example, the power conditioner 820. The power conditioner 820 manages the application in which the power storage capacity capable of being stored in the storage battery 830 is used, for example, using a flag. The power conditioner 820 charges the storage battery 830 with the power corresponding to the power storage capacity $R(n)=Sp(t)+\Delta r$ reserved in the storage battery 830 for cutting the upper limit value Eth in the building, in the power stored in the storage battery 830, before the time t16 when the power consumption is estimated to exceed the upper limit value Eth. The power conditioner 820 supplies the power corresponding to the power storage capacity reserved in the storage battery 830 for cutting the upper limit value Eth to the power distribution board 850 in the building in response to an instruction transmitted from the HEMS controller 700.

Figure 8:
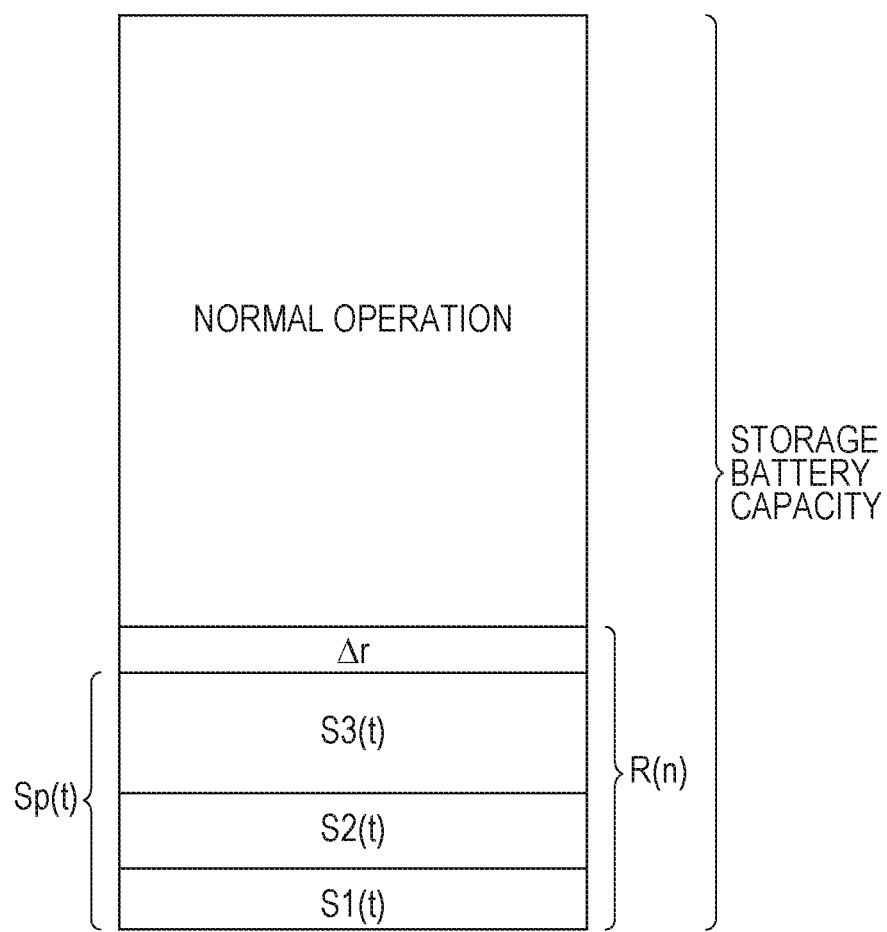
FIG. 8 illustrates power storage capacity R(n) reserved in a storage battery 830 in advance.

FIG. 8 illustrates the power storage capacity R(n) reserved in the storage battery 830 in advance. As illustrated in FIG. 6, the power conditioner 820 reserves the capacity reserved for a normal operation of the power conditioner 820 and the power storage capacity R(n) for cutting the peak power to be supplied to the building, in the storage battery capacity of the storage battery 830. FIG. 6 illustrates an example in which the power corresponding to the power storage capacity R(n)=Sp(t)+Δr is reserved in the storage battery 830 in consideration of the result of estimation in FIG. 5. For example, when the estimated power consumption values from the time t11 to the time t26 represent the result of estimation of the power consumption during one day, the power conditioner 820 charges the storage battery 830 with the power corresponding to the power storage capacity R(n) before the time t11 (before start of the day). The power conditioner 820 may charge the power conditioner 820 during a time period before the time when the power consumption is estimated to exceed the upper limit value Eth, in which the electricity rate is relatively inexpensive.

<Operation>

Figure 9:
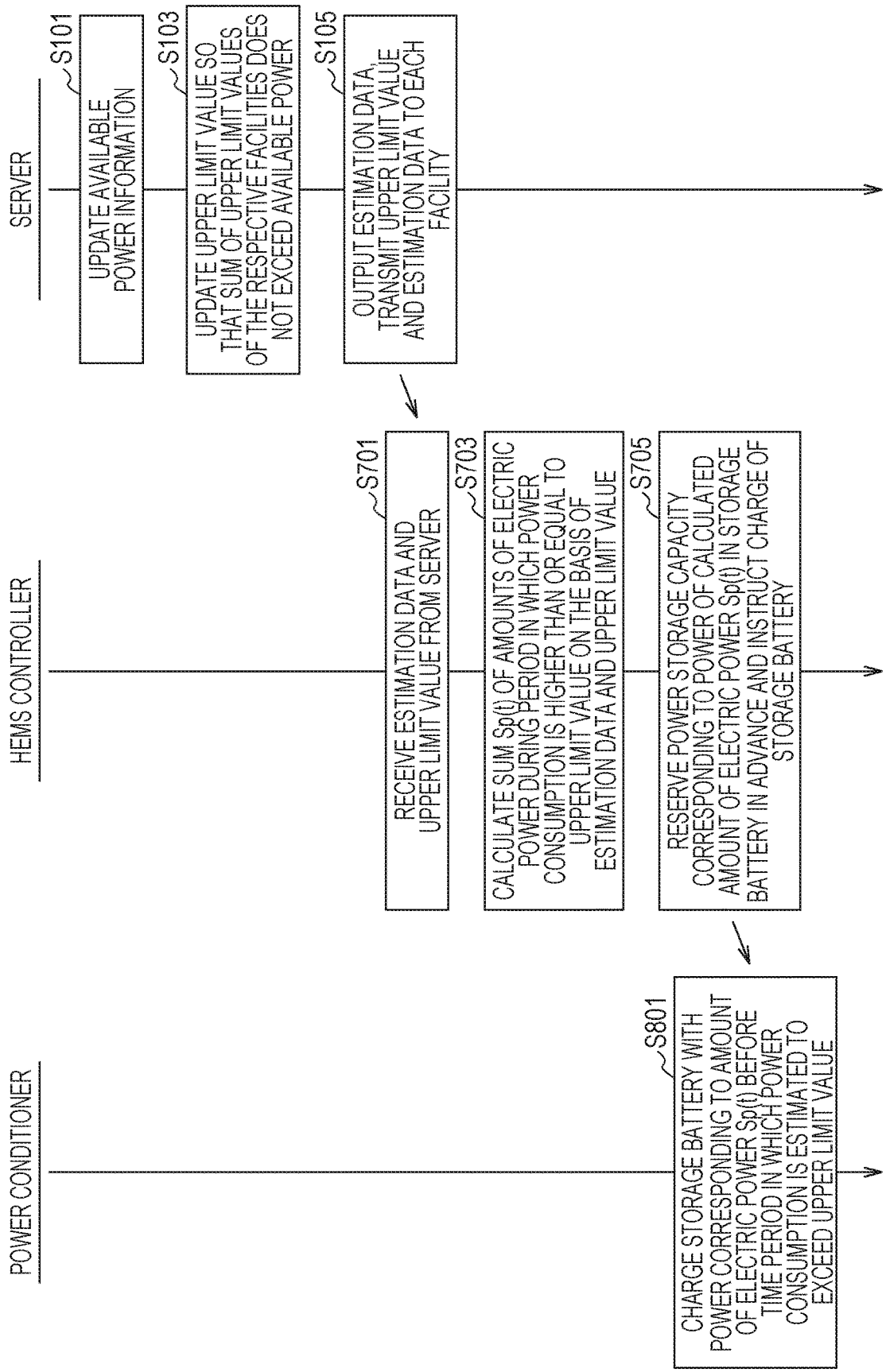
FIG. 9 is a flowchart illustrating a process in which the server 100 of the first embodiment sets the upper limit value of each facility and the HEMS controller 700 controls charge of the storage battery 830 and discharge from the storage battery 830 so that the power to be supplied from a system does not exceed the upper limit value set by the server 100.

FIG. 9 is a flowchart illustrating a process in which the server 100 of the first embodiment sets the upper limit value of each facility and the HEMS controller 700 controls charge of the storage battery 830 and discharge from the storage battery 830 so that the power to be supplied from the system does not exceed the upper limit value set by the server 100. The process illustrated in FIG. 7 is repeated by, for example, the HEMS controller 700 that carries out an instruction to realize the process at predetermined times.

In Step S101, the control unit 107 in the server 100 receives the available power information indicating the power available from the power plant 10 as the system power from the computer system in the power plant 10 and stores the received available power information in the storage unit 106 as the available power information 164.

In Step S103, the control unit 107 sets the upper limit value of each facility so that the sum of the upper limit values of the power to be supplied from the system to the respective facilities does not exceed the available power information 164 to update the upper limit value management data 163.

In Step S105, the control unit 107 transmits the estimation data about the power consumption in each facility and the upper limit value of each facility to each facility.

In Step S701, the control unit 707 in the HEMS controller 700 receives the estimation data about the power consumption and the upper limit value from the server 100 and stores the received estimation data in the storage unit 704 as the power consumption estimation data 741. The control unit 707 stores the upper limit value received from the server 100 in the storage unit 704 as the peak power upper limit value 742.

In Step S703, the control unit 707 in the HEMS controller 700 calculates the sum Sp(t) of the amounts of electric power during the period in which the power consumption in the facility is higher than or equal to the peak power upper limit value 742 on the basis of the power consumption estimation data 741 and the peak power upper limit value 742.

In Step S705, the control unit 707 reserves the power storage capacity corresponding to the power of the calculated sum Sp(t) in the storage battery 830 in advance and transmits an instruction to charge the storage battery 830 to the power conditioner 820 before the time period in which the power consumption is estimated to exceed the peak power upper limit value 742.

In Step S801, the power conditioner 820 reserves the power storage capacity R(n) resulting from addition of the margin Δr to the sum Sp(t) of the amounts of electric power in the storage battery 830 before the time period in which the power consumption is estimated to exceed the peak power upper limit value 742 upon reception of the instruction to charge the storage battery 830.

Summary of First Embodiment

Through the process described above, the power control system 1 is capable of setting the upper limit of the power to be supplied from the system to a facility, such as a building, to the upper limit value by reserving the power storage capacity in the storage battery 830 in advance to charge the storage battery 830. In other words, the power control system 1 is capable of keeping the power to be supplied to the facility to the magnitude defined in the upper limit value. Accordingly, when the electric power rate supplied to the consumer is composed of the basic rate based on the magnitude of the peak power and the amount-of-electric-power charge based on the power usage, the peak power of the power to be supplied from the system is decreased to reduce the basic rate in the electric power rate for the consumer. Specifically, for the consumer of the power, the peak power to be supplied to the facility is kept to the magnitude defined in the upper limit value and further decreasing the peak power allows the electric power rate to be further reduced.

Also for the electric power company supplying the power, the peak power of each facility is smoothed to a level defined in the upper limit value and the supply of power is stabilized while remaining enough power to be supplied at the peak. Management of the upper limit value of the power to be supplied from the system to each facility by the power control system determines the upper limit of the power to be supplied from the system to each facility regardless of the magnitude of the power consumption in each facility. Determining the upper limit value of the power to be supplied from the system to each facility (for example, on the basis of the available power information 164 from the power plant 10) by the server 100 realizes a status in which much power is used in each facility while stabilizing the demand of power. For example, the upper limit value of the power to be supplied from the system to each facility is momently determined in accordance with, for example, the variation with time in the power consumption in each facility so that the power does not exceed the maximum power available from the electric power supplier (the electric power company).

Consequently, it is possible to realize the status in which much power is used in each facility while stabilizing the supply of power in accordance with the variation in the available maximum power. In other words, it is possible to respond to requests from both the consumer and the electric power supplier by controlling the supply of power to multiple facilities.

Second Embodiment

A notification control system according to another embodiment will now be described. In the first embodiment, as one example, the HEMS controller 700 calculates the sum Sp(t) of the amounts of electric power during the period in which the estimated power consumption value exceeds the upper limit value on the basis of the result of estimation of the power consumption during one day and reserves the power corresponding to (the amount of electric power resulting from addition of the margin Δr to) the calculated sum Sp(t) of the amounts of electric power in the storage battery 830. As another example, the differences (power S1($t$), power S2($t$), and power S3($t$)) between the estimated power consumption values and the upper limit value during each time period in which the power consumption exceeds the upper limit value in the estimation data about the power consumption may be calculated and the storage battery 830 may be charged with the power corresponding to each amount of electric power that is calculated before each time period in which the power consumption exceeds the upper limit value.

Figure 10:
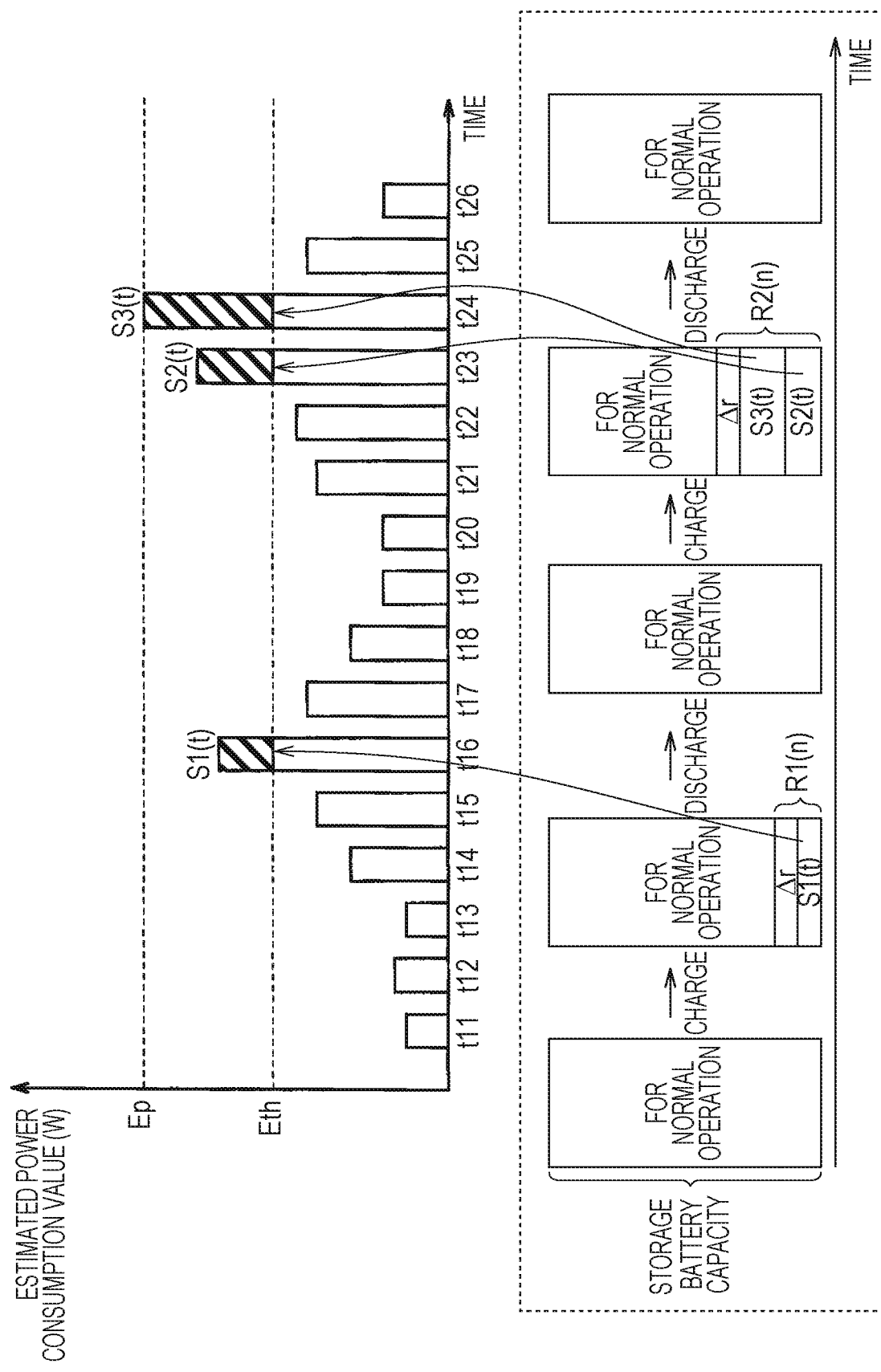
FIG. 10 illustrates the power consumption estimation data 162 resulting from estimation of the variation with time in the power consumption and the power storage capacity reserved in the storage battery 830 in a second embodiment.

FIG. 10 illustrates the power consumption estimation data 162 resulting from estimation of the variation with time in the power consumption and the power storage capacity reserved in the storage battery 830 in a second embodiment.

As illustrated in FIG. 10, the HEMS controller 700 calculates the power S1($t$) corresponding to the difference between the power consumption and the upper limit value at the time t16, calculates the power S2($t$) corresponding to the difference between the power consumption and the upper limit value at the time t23, and calculates the power S3($t$) corresponding to the difference between the power consumption and the upper limit value at the time t24. The HEMS controller 700 charges the storage battery 830 with the power corresponding to the power S1($t$) consumed over the upper limit value at the time t16 before the time t16. In FIG. 10, the HEMS controller 700 reserves the power storage capacity R1($n$)=S1($t$)+Δr resulting from addition of the margin Δr to the power S1($t$) in the storage battery 830 before the time t16. It is assumed that the power consumption in the facility exceeds the upper limit value at the time t16. In this case, the power conditioner 820 supplies the power stored in the storage battery 830 to the power distribution board 850 in the facility to keep the power to be supplied from the system to the facility to the magnitude of the upper limit value. In other words, the HEMS controller 700 supplies the power reserved in the storage battery 830 to the facility as the power consumed in the facility over the upper limit value.

It is estimated in the power consumption estimation data 162 that the power is consumed over the upper limit value at the time t23 and the time t24. The HEMS controller 700 charges the storage battery 830 with the power corresponding to the sum of the power S2($t$) (W) and the power S3($t$) (W) before the time t23. In FIG. 10, the HEMS controller 700 reserves the power storage capacity R2($t$)=S2($t$)+S3($t$)+Δr resulting from addition of the margin Δr to the sum of the power S2($t$) and the power S3($t$) in the storage battery 830 before the time t23. It is assumed that the power consumption in the facility exceeds the upper limit value at the time t23 and the time t24. In this case, the power conditioner 820 supplies the power stored in the storage battery 830 to the power distribution board 850 in the facility to keep the power to be supplied from the system to the facility to the magnitude of the upper limit value.

Summary of Second Embodiment

In the power control system of the second embodiment, the storage battery 830 is charged with the power corresponding to the power consumed over the upper limit value during each time period before each time period in which the power consumption exceeds the upper limit value. In other words, since the power storage capacity to be reserved in the storage battery 830 for keeping the power to be supplied from the system to the facility to the upper limit value is reserved in the storage battery 830 for each time period, the power storage capacity reserved in the storage battery 830 is decreased as much as possible and the power storage capacity reserved for the normal operation of the power conditioner 820 is made relatively high. Accordingly, it is possible to keep the degree of freedom of the control of the power conditioner 820, such as supply and selling of power to the facility in accordance with the amount of power generated in the solar cell module 810, to a high level.

Third Embodiment

In the above embodiments, as described above with reference to FIG. 9, the server 100 outputs the estimation data about the power consumption in each facility with the power consumption estimator 171 and the HEMS controller 700 controls the calculation of the amount of electric power to be stored in the storage battery 830 and the charge of the storage battery 830 so as not to exceed the peak power upper limit value 742 indicating the upper limit value of the power to be supplied from the system to the facility on the basis of the power consumption estimation data 741 with the charge controller 772 and the supply controller 773. In addition, the processing in Step S703 and the processing in Step S705 may be performed by the server 100 or another device.

In the above embodiments, as described above with reference to FIG. 1 and so on, the multiple facilities are included in the power control system 1, the devices including the storage battery are provided in each facility, and the server 100 sets the upper limit value of the power to be supplied from the system (upper limit value management data) for each facility and transmits the upper limit value of each facility to the facility (Step S105). In addition, the storage battery 830 may be provided in part of the multiple facilities the supply of power to which is controlled by the server 100, the upper limit value may be transmitted to the facility in which the storage battery 830 is provided, and the power supplied to the facility may be controlled on the basis of the upper limit value.

The power control systems according to the above embodiments are each realized by processors and programs executed on the processors. The programs realizing the embodiments are provided through, for example, transmission and reception using a network via the communication interfaces.

It will be recognized and understood that the embodiments disclosed above are only examples and the present disclosure is not restricted by the embodiments. The sprit and scope of the present invention are indicated not by the above description but by the spirit and scope of the appended claims and all modifications having meanings and scope equivalent to those of the appended claims can be made in the invention.

REFERENCE SIGNS LIST

1 power control system
10 power plant
20A, 20B, 20C facilities
100 server
600 broadband router
700 HEMS controller 800 home electrical appliances
810 solar cell module
820 power conditioner
830 storage battery
850 power distribution board
860 multi-energy monitor
870 multi-circuit CT sensor 870
880 tap
900 Internet

The invention claimed is:

1. A power control system for controlling supply of power to a plurality of facilities, the power control system comprising:
   a server;
   storage batteries that are respectively provided in the plurality of facilities, wherein each of the storage batteries is charged with power that is supplied, and discharges stored power to supply power to a facility, among the plurality of facilities, in which the storage battery is provided;
   devices that are respectively provided in the plurality of facilities, wherein each of the devices consumes the power supplied from the storage batteries to the facility and power supplied from a system to the facility; and
   controllers that are respectively provided in the plurality of facilities, wherein
   each of the controllers receives, from the server, estimation data generated by estimating a variation with time in power consumption in the facility in which the controller is provided,
   the server includes a memory which stores upper limit value management information indicating an upper limit value of the power to be supplied from the system to the facility;
   each of the controllers configured to:
   select a specific time period from amongst a plurality of time periods, in the specific time period, determine whether the power consumption is estimated to exceed the upper limit value of the power to be supplied from the system to the facility on the basis of the estimation data;
   calculate a sum of power to be consumed over the upper limit value during the specific time period;
   charge the storage battery in the facility with an amount of electric power corresponding to the calculated sum of power, ahead of the specific time period; and
   supply the power stored in the storage battery in the facility to the facility when the power consumption in the facility is to exceed the upper limit value such that an upper limit of the power supplied from the system to the facility falls within the upper limit value,
   the server configured to:
   sequentially acquire available power data indicating a total amount of power capable of being supplied to the plurality of facilities; and
   determine the upper limit value of the facility on the basis of the estimation data such that a sum of the power consumption in the plurality of facilities does not exceed the total amount of the available power indicated in the available power data when a maximum value of the power consumption in the facility is made not higher than the upper limit value of the facility and storing the determined upper limit value in the memory.

2. The power control system according to claim 1, wherein the server is configured to determine the upper limit value of the facility on the basis of the estimation data such that the sum of the power consumption in the plurality of facilities is balanced with the total amount of the available power indicated in the available power data when the maximum value of the power consumption in the facility is made not higher than the upper limit value of the facility and stores the determined upper limit value in the memory.

3. A method for controlling supply of power to a plurality of facilities,
   wherein the plurality of facilities is respectively provided with storage batteries, wherein each of the storage batteries is charged with power that is supplied and discharges stored power to supply power to a facility, among the plurality of facilities, in which the storage battery is provided,
   wherein devices that are respectively provide in the plurality of facilities, wherein each of the devices consumes the power supplied from the storage battery to the facility and power supplied from a system to the facility, and
   wherein controllers that are respectively provided in the plurality of facilities, each of the controllers receives, from a server, estimation data generated by estimating a variation with time in power consumption in the facility in which the controller is provided, and the server includes a memory which stores upper limit value management information indicating an upper limit value of the power to be supplied from a system to the facility, the method comprising:
   selecting a specific time period from amongst a plurality of time periods, in the specific time period, determining whether the power consumption is estimated to exceed the upper limit value of the power to be supplied from the system to the facility on the basis of the estimation data;
   calculating a sum of power to be consumed over the upper limit value during the specific time period;
   charging the storage battery in the facility with an amount of electric power corresponding to the calculated sum of power, ahead of the specific time period;
   supplying the power stored in the storage battery in the facility to the facility when the power consumption in the facility is to exceed the upper limit value such that an upper limit of the power supplied from the system to the facility falls within the upper limit value,
   sequentially acquiring available power data indicating a total amount of power capable of being supplied to the plurality of facilities; and
   determining the upper limit value of the facility on the basis of the estimation data such that a sum of the power consumption in the plurality of facilities does not exceed a total amount of available power indicated in the available power data when a maximum value of the power consumption in the facility is made not higher than the upper limit value of the facility and storing the determined upper limit value in a memory.

4. A power control apparatus for controlling supply of power to a facility through communication with an external communication device,
   wherein the facility is provided with a storage battery, the storage battery is charged with power that is supplied and discharges stored power to supply power to the facility, among a plurality of facilities, in which the storage battery is provided,
   wherein devices are respectively provided in the plurality of facilities, each of the devices consumes power supplied from the storage battery to the facility and power supplied from a system to the facility, wherein the power control apparatus receives, from the external communication device, estimation data generated by estimating a variation with time in power consumption in the facility in which the power control apparatus is provided, wherein the external communication device includes a memory which stores upper limit value management information indicating an upper limit value of the power to be supplied from the system to the facility, the power control apparatus comprising:

a communication unit communicating with the external communication device;

a charge controller controlling the charge of the storage battery;

an estimation data storage storing the estimation data generated by estimating the variation with time in power consumption in the facility;

a setting value storage storing an upper limit value of the power to be supplied from a system to the facility; and a supply controller controlling supply of power from the storage battery to the facility, wherein the communication unit receives the information indicating the upper limit value from the external communication device and stores the received upper limit value in the setting value storage, wherein the charge controller selects a specific time period from amongst a plurality of time periods, in the specific time period, determines whether the power consumption is estimated to exceed the upper limit value of the power to be supplied from the system to the facility on the basis of the estimation data calculates a sum of power to be consumed over the upper limit value during the specific time period; charges the storage battery in the facility with an amount of electric power corresponding to the calculated sum of power, ahead of the specific time period, wherein the supply controller supplies the power stored in the storage battery to the facility when the power consumption in the facility is to exceed the upper limit value such that an upper limit of the power supplied from the system to the facility falls within the upper limit value, and wherein the external communication device is configured to sequentially acquire available power data indicating a total amount of power capable of being supplied to the plurality of facilities, and determine the upper limit value of the facility on the basis of the estimation data such that a sum of the power consumption in the plurality of facilities does not exceed a total amount of available power indicated in the available power data when a maximum value of the power consumption in the facility is made not higher than the upper limit value of the facility and storing the determined upper limit value in the memory.

* * * * *